United States Patent
Schachter et al.

(10) Patent No.: US 10,929,692 B2
(45) Date of Patent: Feb. 23, 2021

(54) LANE LEVEL POSITION DETERMINATION

(71) Applicant: VEONEER US INC., Southfield, MI (US)

(72) Inventors: Nicholas Ari Schachter, Pepperell, MA (US); Daniel McFarland, Holden, MA (US)

(73) Assignee: VEONEER US INC., Southfield, MI (US)

( * ) Notice: Subject to any disclaimer, the term of this patent is extended or adjusted under 35 U.S.C. 154(b) by 102 days.

(21) Appl. No.: 16/268,864

(22) Filed: Feb. 6, 2019

(65) Prior Publication Data
US 2020/0250438 A1    Aug. 6, 2020

(51) Int. Cl.
*G01C 21/36* (2006.01)
*G06K 9/00* (2006.01)
*G01S 19/13* (2010.01)

(52) U.S. Cl.
CPC ..... *G06K 9/00798* (2013.01); *G01C 21/3676* (2013.01); *G01S 19/13* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,555,312 A * | 9/1996 | Shima | | G06K 9/00 382/104 |
| 6,819,779 B1 * | 11/2004 | Nichani | | 382/104 |
| 7,379,815 B2 * | 5/2008 | Kobayashi | | G05D 1/0246 701/300 |
| 8,184,859 B2 * | 5/2012 | Tanji | | G06K 9/00798 382/104 |
| 8,560,220 B2 * | 10/2013 | Gottsch | | B60W 40/06 701/301 |
| 10,139,244 B2 * | 11/2018 | Schilling | | G08G 1/167 |
| 10,254,414 B2 * | 4/2019 | McFarland | | G01S 19/49 |
| 2006/0015252 A1 * | 1/2006 | Yamamoto | | G01S 17/931 701/301 |
| 2010/0121518 A1 * | 5/2010 | Tiernan | | G01C 21/165 701/26 |
| 2010/0253598 A1 * | 10/2010 | Szczerba | | G01S 13/931 345/7 |
| 2012/0203452 A1 | 8/2012 | Jacobs | | 701/411 |
| 2017/0227968 A1 * | 8/2017 | Klinger | | H01Q 3/26 |

FOREIGN PATENT DOCUMENTS

JP    WO2018/179616 A1    4/2018

* cited by examiner

*Primary Examiner* — Tsung Yin Tsai
(74) *Attorney, Agent, or Firm* — Christopher P. Maiorana, PC

(57) ABSTRACT

An apparatus includes a sensor, a navigation circuit and a control circuit. The sensor may be configured to generate surrounding road information of a road. The road may have a plurality of available lanes. The navigation circuit may be configured to determine a current position of the apparatus on the road. The control circuit may be configured to (i) access map data that identifies a number of the available lanes in the road proximate the position, (ii) determine a current lane among the available lanes that the apparatus is within based on all of the position, the surrounding road information and the map data and (iii) generate feedback data based on both the position and the current lane. The navigation device may be further configured to adjust the current position to a center of the current lane in response to the feedback data.

20 Claims, 5 Drawing Sheets

LANE LEVEL POSITION DETERMINATION

FIELD OF THE INVENTION

The invention relates to digital maps generally and, more particularly, to a method and/or apparatus for implementing a method for determining lane level position.

BACKGROUND

Standard map-matching techniques for conventional Global Position Satellite-based navigation systems assume a vehicle is traveling along a center line of a road. For single lane roads, the assumption provides a more stable position estimate than raw location values determined by a Global Position Satellite receiver in the vehicle. The Global Position Satellite receiver data often contains noise and other inaccuracies. Furthermore, the conventional map-matching to the center line obscures lane level positioning variations for multi-lane roads.

It would be desirable to implement a lane level position determination.

SUMMARY

The invention concerns an apparatus including a sensor, a navigation circuit and a control circuit. The sensor may be configured to generate surrounding road information of a road. The road may have a plurality of available lanes. The navigation circuit may be configured to determine a current position of the apparatus on the road. The control circuit may be configured to (i) access map data that identifies a number of the available lanes in the road proximate the position, (ii) determine a current lane among the available lanes that the apparatus is within based on all of the position, the surrounding road information and the map data and (iii) generate feedback data based on both the position and the current lane. The navigation device may be further configured to adjust the current position to a center of the current lane in response to the feedback data.

BRIEF DESCRIPTION OF THE FIGURES

Embodiments of the invention will be apparent from the following detailed description and the appended claims and drawings in which:

FIG. 4 is a diagram illustrating Karnaugh maps used to define state transitions in a state machine in accordance with an example embodiment of the invention.

DETAILED DESCRIPTION OF THE EMBODIMENTS

Embodiments of the present invention include a lane level position determination that may (i) center a vehicle position on a current lane, (ii) operate in multi-lane environments, (iii) account for lanes being added to the road, (iv) account for lanes being removed from the road, (v) utilize a state machine to maintain awareness of a current lane and/or (vi) be implemented as one or more integrated circuits.

Figure 1:
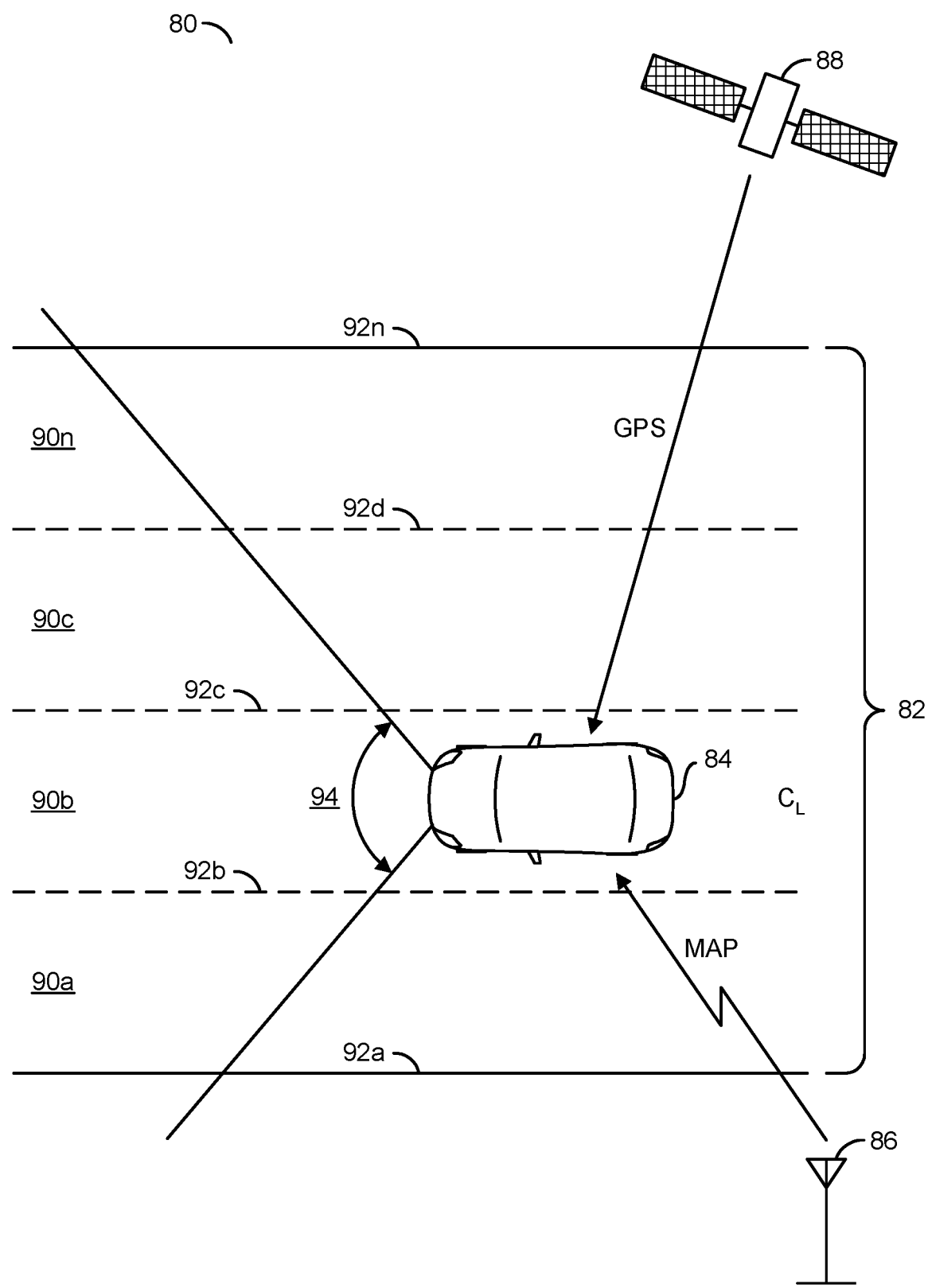
FIG. 1 is a block diagram of a system illustrating a context of the invention.

Referring to FIG. 1, a block diagram of a system 80 is shown illustrating a context of the invention. The system 80 generally comprises a road (or surface) 82, a vehicle 84, an antenna (or tower) 86 and multiple satellites (one shown) 88. The road 82 generally comprises multiple lanes 90a-90n and multiple lane markers 92a-92n. The vehicle 84 may include one or more sensors that have a field of view 94 sufficiently wide to see a width of the road 82.

Multiple signals (e.g., GPS) may be transferred from the satellites 88 to the vehicle 84. The signals GPS may contain satellite navigation information. A signal (e.g., MAP) may be transferred from the antenna 86 to the vehicle 84. The signal MAP may carry forward looking digital horizon map data (e.g., high definition digital maps, electronic horizon or advanced driver assistance systems map data). The forward looking digital horizon map data generally provides data about the road 82 for a distance ahead of and behind the vehicle 84. The road data may include, but is not limited to a number of available lanes and a type of road surface at various distances ahead of and behind the vehicle 84.

Embodiments of the system 80 may implement a Global Position Satellite receiver to provide a coarse position of the vehicle 84 on the road 82 based on the signals GPS. Map data received through the signal MAP may provide (i) details of how many lanes 90a-90n (e.g., lane numbers 1 to N) exist in the road 82 at and near the coarse location and (ii) road type data. A lane location state machine in the vehicle 84 may track a current lane (e.g., $C_L$) of the road 82 that the vehicle 84 is believed to be in at any given moment. A sensor on/in the vehicle 84 looking at the road 82 ahead of the vehicle 84 generally provides information about the current lane $C_L$ and the lane markers 92a-92n in the road 82. Using a combination of the coarse position, the number N of lanes 90a-90n, and a width of the current lane $C_L$, the lane location state machine may map-match to a center position of the current lane $C_L$, rather than the center of the road 82. The center-of-the-lane position may be transferred to the Global Position System receiver in real time as feedback data to adjust the coarse position.

Figure 2:
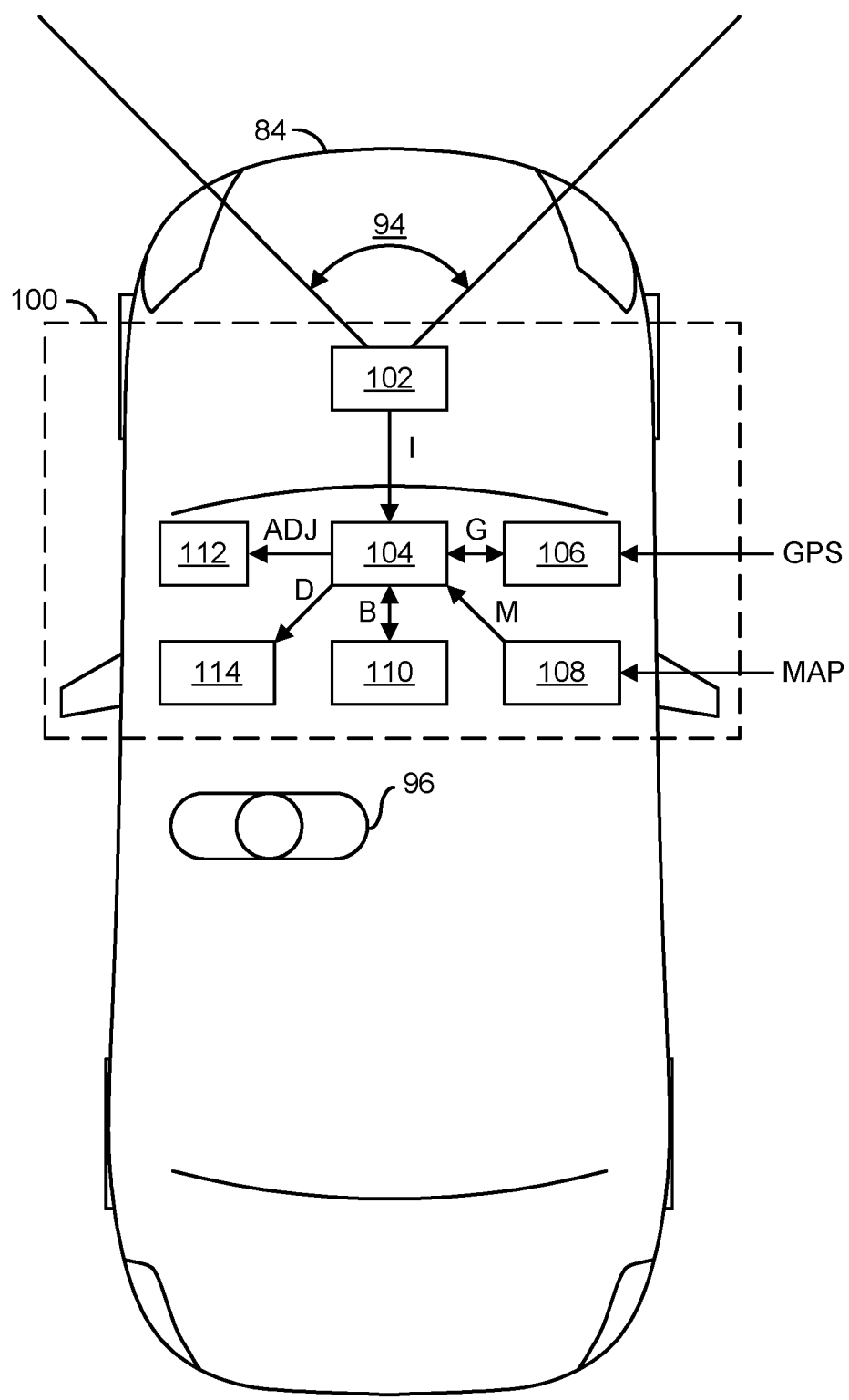
FIG. 2 is a diagram illustrating an implementation of an apparatus in accordance with an example embodiment of the present invention.

Referring to FIG. 2, a diagram illustrating an implementation of an apparatus 100 is shown in accordance with an example embodiment of the present invention. The apparatus 100 may be mounted totally within, or at least partially within the vehicle 84. The apparatus (or system) 100 generally comprises a block (or circuit) 102, a block (or circuit) 104, a block (or circuit) 106, a block (or circuit) 108, a block (or circuit) 110, a block (or circuit) 112 and a block (or circuit) 114. The circuits 102-114 may be implemented as hardware, software executing on hardware, one or more integrated circuits and/or simulated with software.

A signal (e.g., I) may be generated by the circuit 102 and transferred to the circuit 104. The signal I may convey surrounding road information (e.g., lane widths, marker types, lane marker crossing indications and video) about the road 82 created by the circuit 102. A bidirectional signal (e.g., G) may be transferred between the circuit 106 and the circuit 104. The signal G may carry GPS position data (e.g., latitude value, Longitude value, adjustment information and confidence information). The circuit 108 may generate a signal (e.g., M) transferred to the circuit 104. The signal M may transfer map data. A bidirectional signal (e.g., B) may be exchanged between the circuit 104 and the circuit 110. The signal B may contain information (e.g., road type and number of lanes) about the road 82. A signal (e.g., D) may be generated by the circuit 104 and transferred to the circuit 114. The signal D may convey display information. A signal (e.g., ADJ) may be generated by the circuit 104 and provided to the circuit 112. The signal ADJ may contain automotive (or vehicle) related data.

The circuit 102 may implement a sensor. In various embodiments, the sensor 102 may be an optical camera. The camera 102 is generally operational to provide the surrounding road information (or image data) in the signal I. The road information may include lane width data, marker type data, lane change indicators and video of the road 82 ahead of the vehicle 84 within the field of view 94. In various embodiments, the camera 102 may be a color camera. The color may be useful for distinguishing between solid-yellow lane markers (e.g., leftmost lane markers) from solid-white lane markers (e.g., rightmost lane markers). In various embodiments, the camera 102 may provide an estimated lane width for at least the current lane $C_L$ in the center of the field of view 94. In some embodiments, the camera 102 may provide estimated lane widths for the lane(s) neighboring the center lane $C_L$. In other embodiments, the camera 102 may provide estimated lane widths for all of the lanes 90a-90n within the field of view 94. The lane widths may be determined using standard image recognition methods and standard analysis methods implemented in the camera 102. The camera 102 may also identify all lane markers 92a-92n within the field of view 94. When the camera 102 crosses over a lane marker 92a-92n, the camera 102 may notify the circuit 104 that a lane change is occurring. Identification of the lane markers 92a-92n and the lane changes may be determined using standard image recognition methods and standard analysis methods implemented in the camera 102. The camera 102 may transfer the road information to the circuit 104 in the signal I.

One or more other types of sensors may be used in conjunction with or in place of the camera 102. Example sensors 102 may include, but are not limited to, radar sensors, light detection and ranging (LiDAR) sensors, inertial sensors, thermal imaging sensors, and/or acoustic sensors. Some of the sensors 102 may detect objects on the side of the road 82 to provide estimations of a left boundary and a right boundary of the road 82. From the left boundary and the right boundary, a width of the road 82 may be calculated. From the calculated width, an estimation of how may lanes 90a-90n probably fit within the width may be made based on a standard lane width. Thereafter, the sensors 102 may estimate the current lane $C_L$ that the vehicle 84 occupies based on the relative distances of the sensors 102 on the vehicle 84 to the left boundary and the right boundary of the road 82 and the estimated number of lanes 90a-90n. Lane crossovers may be determined by the sensors 102 based on the estimated numbers of lanes and changes in the relative distances to the left boundary and/or the right boundary.

The circuit 104 may implement a control circuit (e.g., an electronic control unit). The control circuit 104 is generally operational to keep track of the current lane $C_L$ that the vehicle 84 occupies, correct the current position of the vehicle 84 to a center of the current lane $C_L$, and provide feedback data to the circuit 106. The tracking may be based on the satellite position data received in the signal GPS, the map data received in the signal B and the road information received in the signal I. The feedback data may include an adjustment value and a corresponding confidence value. The control circuit 104 may be further operational to generate displayable information in the signal D based on information in the signal I, the satellite position data in the signal GPS and the map data in the signal B. The control circuit 104 may also be operational to generate vehicle-type information in the signal ADS. Map data received from the circuit 108 via the signal M may be transferred to the circuit 110 in the signal B for storage and subsequent retrieval.

The circuit 106 may implement a satellite-navigation device. In various embodiments, the circuit 106 may be a Global Positioning System receiver. Other types of satellite-navigation devices may be implemented to meet the design criteria of a particular application. The satellite-navigation device (or navigation circuit for short) 106 is generally operational to provide the latitude data and the longitude data of the vehicle 84 based on the signals GPS received from the satellites 88. The navigation circuit 106 may also be operational to adjust the latitude data and the longitude data based on the adjustment value and a corresponding confidence value received from the control circuit 104 in the signal G. The confidence value may have a range from zero (e.g., unreliable) to one (e.g., reliable). If the confidence value is above a high threshold (e.g., >0.7), the navigation circuit 106 may correct the latitude data and the longitude data per the adjustment value. If the confidence value is below a low threshold (e.g., <0.3), the navigation circuit 106 may ignore the adjustment value. If the confidence value is between the high threshold and the low threshold, the navigation circuit 106 may apply a correction to both the latitude data and the longitude data that is a linear weighting based on the degree of confidence.

The circuit 108 may implement a radio-frequency receiver. The radio-frequency receive 108 may be operational to receive the map data in the signal MAP from the antenna 86. The map data may be converted to a digital form and presented to the control circuit 104 in the signal M.

The circuit 110 may implement a storage device. In various embodiments, the storage device 110 may be a hard-disk drive and/or a solid-state drive. The storage device 110 is generally operational to store the map data received by the vehicle 84 through the radio-frequency receiver 108. The storage device 110 generally enables the control circuit 104 to access the map data in real time via the signal B.

The circuit 112 may implement automotive circuitry. The automotive circuitry 112 may include, but is not limited to autonomous driver circuitry, accident prevention circuitry, traffic control circuitry and vehicle-to-vehicle communication circuitry. The automotive circuitry 112 may use the position data and the lane data generate by the control circuit 104 in the signal ADJ as input parameters.

The circuit 114 may implement a display circuit. The display circuit 114 is generally operational to provide a two-dimensional visual display to the driver 96. The visual display may be based on the information received from the control circuit 104 in the signal D. In some modes, the visual display may be a birds-eye view of a vehicle icon in a simulated road showing the vehicle icon in the current lane $C_L$. In other modes, the visual display may be the road 82 as seen by the sensor 102.

Figure 3:
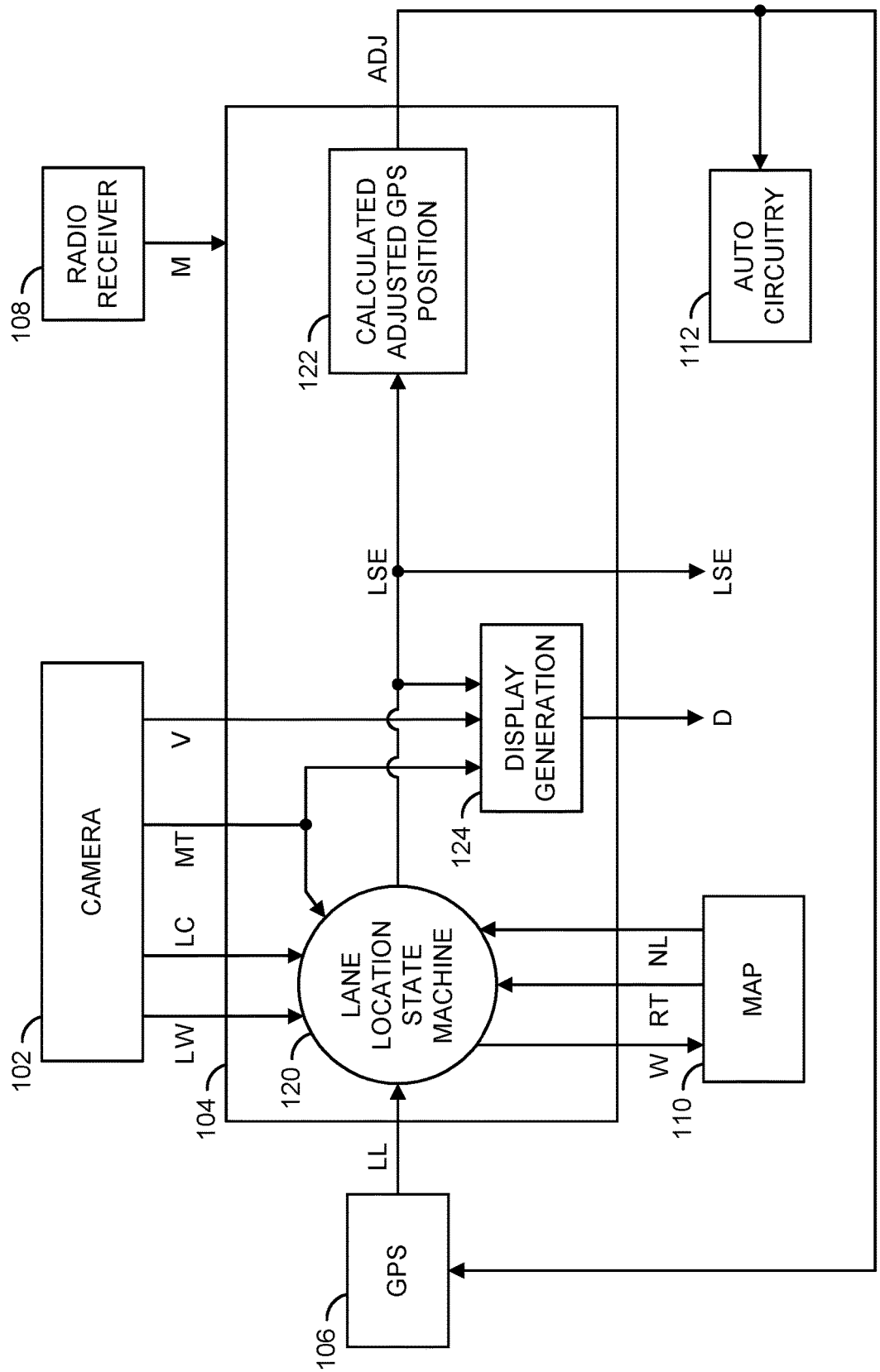
FIG. 3 is a diagram illustrating an implementation of a control circuit in the apparatus in accordance with an example embodiment of the invention.

Referring to FIG. 3, a diagram illustrating an implementation of the control circuit 104 is shown in accordance with an example embodiment of the invention. The control circuit 104 generally comprises a block (or circuit) 120, a block (or circuit) 122 and a block (or circuit) 124. The circuits 120-124 may be implemented as hardware, software executing on hardware, one or more integrated circuits and/or simulated with software.

The signal GPS may be implement as multiple signals (e.g., LL and ADJ). The signal LL may carry the longitude data and the latitude data as determined by the navigation circuit 106. The signal ADJ may carry the adjustment data generated by the control circuit 104 to enable the navigation circuit 106 to correct the latitude data and the longitude data to a finer degree of accuracy and to a center of a current lane. The signal ADJ may also carry a confidence value of the adjustment data. The signal I may be implemented as multiple signals (e.g., LW, LC, MT and V). The signal LW may carry lane width data. The signal LC may carry a Boolean flag that indicates whether a lane change is occurring or not. The signal MT may carry lane marker type data. The signal V may carry video data. The signal B may be implemented as multiple signals (e.g., RT, NL and W). The signal RT may convey road type data about the current road 82. The signal NL may identify the number N of the lanes 90a-90n in the road 82 at the current location of the vehicle 84. The signal W may carry the map data received from the antenna 86 via the signal M to be written in the storage device 110. A signal (e.g., LSE) may be generated by the circuit 120 and presented to the circuits 122 and 124. The signal LSE may contain a lane state estimation (e.g., identification of the current lane $C_L$ in the road 82). The signal LSE may also be presented as an output signal from the control circuit 104 to any other circuitry in the vehicle 84 that may utilize the lane state estimation information.

The circuit 120 may implement a state machine circuit. In various embodiments, the circuit 120 may be a lane location state machine. The state machine circuit 120 is generally operational to track the current lane $C_L$ among the many lanes 90a-90n of the road 82 at the current location. The tracking may be based on the latitude data (e.g., the signal LL), the longitude data (e.g., the signal LL), the road type data (e.g., the signal RT), the number of lanes data (e.g., the signal NL), the lane width data (e.g., the signal LW), the lane marker type data (e.g., the signal MT) and the lane marker crossing indication (e.g., the signal LC). An estimated current lane number and a fine-accuracy location of the vehicle 84 in the current lane $C_L$ may be presented in the signal LSE.

The circuit 122 may implement an adjustment circuit. The adjustment circuit 122 may be operational to calculate the adjustment value and the corresponding confidence value in the signal ADJ based on the signal LSE. The adjustment circuit 122 may implement standard statistical methods to calculate a confidence value in each confidence interval. The adjustment data may be used by the navigation circuit 106 to update the longitude data and the latitude data to indicate that the vehicle 84 is at a center of the current lane $C_L$.

The circuit 124 may implement a display generation circuit. The circuit 124 is generally operational to generate display information in the signal D based on the lane estimation data in the signal LSE in and/or the video of the road 82 taken by the sensor 102 in the signal V. The display information may include, but is not limited to, a birds-eye graphical representation of the surrounding road 82 and the video in the signal V received from the sensor 102 of the road 82 ahead of the vehicle 84.

Referring to FIG. 4, a diagram illustrating Karnaugh maps 140 used to define state transitions in the state machine circuit 120 are shown in accordance with an example embodiment of the invention. Each of the Karnaugh maps 140 may include a parameter 142, a parameter 144 and a parameter 146 in consecutive rows along an axis. A perpendicular axis may contain a column for each lane 90a-90n of the road 82 at the current location.

The parameter 142 may contain a Boolean value in each column. A true value (e.g., 1) may indicate the current lane $C_L$ that the vehicle 84 occupies. A false value (e.g., 0) may indicate that the vehicle 84 is not in the corresponding lane 90a-90n.

The parameter 144 may contain a width value of the lanes 90a-90n. A width of the current lane $C_L$ may be based on the lane marker data determined by the sensor 102. The width ($W_{TH}$) of the current lane may be based on formula 1 as follows:

$$W_{TH} = ABS(Y_L) + ABS(Y_R) \tag{1}$$

The function ABS(Y) may return an absolute value for the variable Y. The variable $Y_L$ may be a distance to the nearest left lane marker 92a-92n (e.g., 92b in FIG. 1) as seen from the position of the sensor 102. The variable $Y_R$ may be a distance to the nearest right lane marker 92a-92n (e.g., 92c in FIG. 1) as seen from the position of the sensor 102. The variables illustrated in row 144 of FIG. 4 are shown in units of meters (m). Other units may be implemented to meet the design criteria of a particular application.

The parameter 146 may contain an offset value indicating an offset distance of the sensor 102 from the center of the current lane $C_L$. Negative values may signify that the sensor 102 is left of the center of the lane. A zero (or null value) generally means that the sensor 102 is at the center of the current lane. Positive values may signify that the sensor 102 is right of the center of the current lane. An "X" in a column may be a don't care value as the vehicle 84 does not occupy the corresponding lane 90a-90n. The offset values may also be expressed in units of meters.

When the map data indicates that the vehicle 84 is traveling on an access ramp merging into a multi-digitized road 82 (e.g., a freeway), the Boolean data 142 in the state machine circuit 120 may be initialized to true in one of the columns 1 to N, where N is the number of available lanes on the road 82 per the map data. The column initially marked as true depends on whether the merge is on the left side, right side or somewhere in the middle of the road 82.

A Karnaugh map 150 generally illustrates an example initial state of the state machine circuit 102 for a three-lane road (or highway) 82 with the vehicle 84 having just entered the road 82 from the left side. The Boolean 1 in the leftmost column signifies that the vehicle 84 is in the leftmost lane (e.g., lane number N=1 and lane 90a in FIG. 1) of the three lanes. The width of all three lanes may be measured by the sensor 102 as having the same width (e.g., 2 meters wide). The offset parameter 146 may be −0.1 meters to indicate that the vehicle 84 is left of center in the leftmost lane.

Once the state machine circuit 120 is initialized, a current state may update based on when the sensor 102 indicates a lane change and which direction the change is occurring. A Karnaugh map 152 may illustrate a beginning of rightward lane change by the vehicle 84. The Boolean data 142 may still show the vehicle 84 in the leftmost lane. The offset data 146 may illustrate that the vehicle 84 has moved from the left side of the lane center in the Karnaugh map 150 to a right side of the lane center (e.g., +0.5 m) in the Karnaugh map 152. Although the map 152 illustrates an example entry from the left side of the road 82, similar entries onto the road 82 may be captured from the right side or in any lane of the road 82 (e.g., entering in the inner lane of a two-lane-wide entrance ramp onto the road 82).

A Karnaugh map 154 generally shows that the rightward lane change has been detected by the sensor 102. The sensor 102 may observe the vehicle 84 crossing over nearest lane marker to the right of the vehicle 84 (that now becomes the nearest lane marker to the left of the vehicle 84). During the lane marker crossover, the sensor 102 may assert a Boolean true value in the signal LC to notify the state machine circuit 120 that the lane change is in progress. At non-lane crossover times, the sensor 102 may assert a Boolean false value in the signal LC. In response to the lane change, the sensor 102 may update the offset value 146 to show the vehicle 84 on the left side of the center lane (e.g., −0.5 m) of the newly entered current lane $C_L$. The state machine circuit 120 may respond to the lane change by updating the Boolean data 142 to remove the vehicle 84 from the left lane and place the vehicle 84 in the center lane (e.g., lane number N=2).

Merges and other related incidents that might appear to be lane changes to the sensor 102, but may not actually indicate that the vehicle 84 has changed position, may be filtered out by examining the lane markers 92a-92n on either side of the vehicle 84 and checking for continuity in a validity test performed by the state machine circuit 120. For example, if the vehicle 84 is in the leftmost lane and the sensor 102 reports a rightward lane change, the state machine circuit 120 may check a character of the lane markers 92a-92n to the left of the vehicle 84 both before and after the apparent lane change. If the left lane marker was a solid line both before and after the reported lane change, the state machine circuit 120 may ignore (or invalidate) the lane change notification and the state machine is not updated. However, if the left lane marker was solid before the alleged lane change, and became dashed afterwards, the state machine circuit 120 may update the state machine accordingly to indicate (or validate) that the vehicle 84 has moved into a different lane.

A Karnaugh map 156 may illustrate a situation where the road 82 has added a new lane to the left of the vehicle 84. The additional lane (e.g., a new leftmost lane) may be indicated by both the map data and the road information. The state machine circuit 120 may indicate that the Boolean data 142 for the newly added lane is false as the vehicle 84 remains in the same lane as in the Karnaugh map 154.

A Karnaugh map 158 generally illustrates a situation where the rightmost lane (e.g., lane number N=4) in the road 82 ends. The map data and the sensor road information may each notify the state machine circuit 120 that the rightmost lane has ended. In response, the state machine circuit 120 may remove (or invalidate) the rightmost column. The vehicle 84 may remain in the same lane as before in the Karnaugh map 156.

A Karnaugh map 160 may illustrate the vehicle 84 exiting from the road 82 from the right side. The satellite-navigation data and/or the sensor road information may inform the state machine circuit 120 that the vehicle 84 has moved to the right of the rightmost lane and thus is no longer on the road 82. In response to the vehicle 84 leaving the road 82, the state machine circuit 102 may update the Boolean data 142 to false in all columns to show that the vehicle 84 is not in any lane 90a-90n of the road 82. The state machine circuit 120 may transition to a state where the vehicle 84 is considered to be in a null lane off the road 82.

While the vehicle 84 is on the road 82, the control circuit 104/adjustment circuit 122 may use the offset data 146 to generate the adjustment information in the signal ADJ. Where the number of lanes N is odd, an adjustment value (ϕ) may be determined by formula 2 as follows:

$$\phi = W_{TH} \times \left(C_L - \left\lceil \frac{N}{2} \right\rceil\right) \text{ meters} \quad (2)$$

Where ⌈X⌉ may return a ceiling value of X, and $C_L$ may be the current lane according to the state machine circuit 120. Where the number of lanes N is even, the adjustment value may be determined by formula 3 as follows:

$$\phi = W_{TH} \times \left(C_L - \frac{N}{2}\right) \text{ meters} \quad (3)$$

While the vehicle 84 is not on the road 82 (e.g., in the null lane), the control circuit 104/adjustment circuit 122 may set the adjustment data in the signal ADJ to a null (e.g., zero adjustment value).

Figure 5:
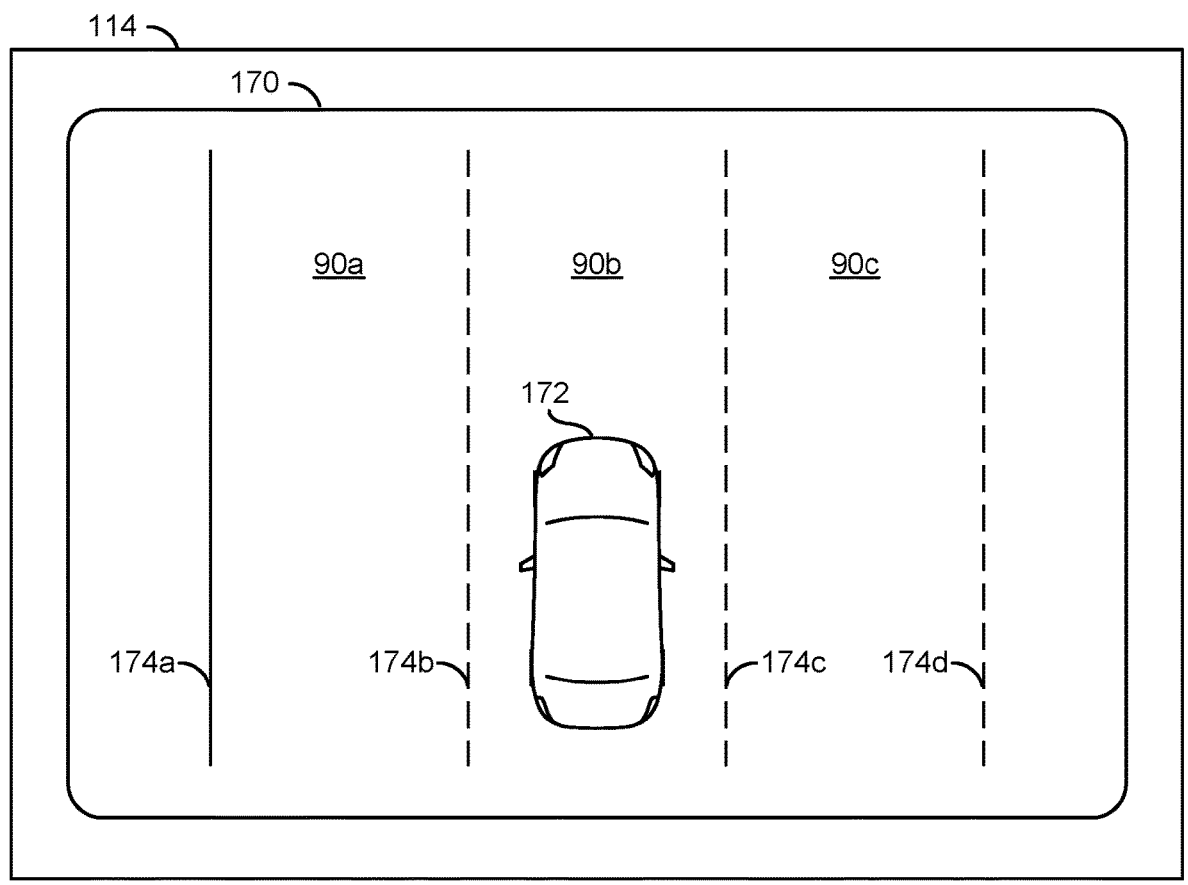
FIG. 5 is a diagram illustrating a scene presented on a display in the apparatus in accordance with an example embodiment of the invention.

Referring to FIG. 5, a diagram illustrating an example scene presented on the display device 114 is shown in accordance with an example embodiment of the invention. The display device 114 may show a graphic representation (or simulation) 170 of the vehicle 84 on the road 82. In the representation 170, the vehicle 84 may be represented by a vehicle-shaped icon 172. At least each neighboring lane 90a-90c (if any) of the total lanes 90a-90n may be separated by lines 174a-174n of the proper type as indicated in the signal MT. In other examples, the scene may be replaced by the actual video taken by the sensor 102 of the road 82 ahead of the vehicle 84. Other information may be displayed on the display device 114 in other modes to meet the design criteria of a particular application.

The functions and structures illustrated in the diagrams of FIGS. 1-5 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), SoCs (system-on-chips), MCM (multi-chip module), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a sensor configured to generate lane change information of said apparatus on a road, wherein said road has a plurality of available lanes;
   a navigation circuit configured to determine a position of said apparatus on said road; and
   a control circuit (a) comprising a state machine and (b) configured to (i) access map data before said apparatus merges onto said road based on said position determined, (ii) initialize said state machine in response to a lane entry of said road, (iii) determine a change of lanes in response to said lane change information and (iv) generate feedback data to said navigation circuit in response to an output of said state machine, wherein (a) said map data comprises (i) said lane entry and (ii) a number of said available lanes, (b) said state machine is configured to update a current lane of said available lanes in response to (i) said change of lanes determined and (ii) a previous location of said current lane and (c) said feedback data is configured to adjust said position determined by said navigation circuit.

2. The apparatus according to claim 1, wherein said state machine is configured to (i) track said current lane among said available lanes and (ii) said change of lanes is determined in response to said sensor detecting that said apparatus crossed over a current lane maker on said road.

3. The apparatus according to claim 1, wherein said state machine is further configured to determine a validity of said change of lanes based on a given lane marker on one side of said apparatus changing from before said change of said current lane to after said change of said current lane.

4. The apparatus according to claim 1, wherein said state machine is further configured to change said current lane to a null lane outside of said available lanes in response to (i) said previous location of said current lane, (ii) said number of said available lanes and (iii) said lane change information indicating that said apparatus has departed from said road.

5. The apparatus according to claim 1, wherein said state machine is configured to (i) initialize said current lane as said lane entry in response to said map data indicating that said apparatus has entered said road.

6. The apparatus according to claim 1, wherein (i) said state machine is further configured to receive a width of said available lanes from said sensor and (ii) a center of said current lane is determined in response to said width of said available lanes.

7. The apparatus according to claim 1, wherein said feedback data comprises (i) an adjustment value that causes said navigation circuit to move said position of said apparatus to a center of said current lane and (ii) a confidence value of said adjustment value.

8. The apparatus according to claim 7, wherein said adjustment value is determined with respect to a center of said road used by said navigation circuit to determine said position.

9. The apparatus according to claim 1, wherein (i) said navigation circuit comprises a Global Positioning System receiver and (ii) said map data comprises a forward looking digital horizon map data.

10. The apparatus according to claim 1, wherein said sensor is one or more of a camera, a light detection and ranging sensor, a radar or any combination thereof.

11. The apparatus according to claim 1, wherein (i) said lane entry is a rightmost lane when said map data indicates a current road merges onto said road from a right side and (ii) said lane entry is a leftmost lane when said map data indicates said current road merges onto said road from a left side.

12. The apparatus according to claim 1, wherein said number of said available lanes is used by said state machine to determine if said apparatus has exited said road.

13. The apparatus according to claim 1, wherein (i) said number of said available lanes and (ii) said lane entry are each determined independent from said sensor.

14. A method for lane level position determination for a vehicle, comprising the steps of:
   generating lane change information of said vehicle on a road from a sensor, wherein said road has a plurality of available lanes;
   determining a position of said vehicle on said road using a navigation circuit;
   accessing map data before said vehicle merges onto said road based on said position determined using a control circuit;
   initializing a state machine of said control circuit in response to an lane entry of said road
   determining a change of lanes in response to said lane change information;
   generating feedback data for said navigation circuit in response to an output of said state machine; and
   adjusting said position determined by said navigation circuit in response to a current lane provided by said feedback data, wherein (a) said map data comprises (i) said lane entry and (ii) a number of said available lanes and (b) said state machine is configured to update said current lane of said available lanes in response to (i) said change of lanes determined and (ii) a previous location of said current lane.

15. The method according to claim 14, wherein (i) said state machine is configured to track said current lane among said available lanes and (ii) said current lane in said state machine is changed to another lane among said available lanes in response to said lane change information indicating that said vehicle is crossing over a current lane marker in said road.

16. The method according to claim 15, further comprising the step of:
   receiving a width of said road at said state machine from said sensor.

17. The method according to claim 16, wherein said feedback data is generated based on said width.

18. The method according to claim 14, further comprising the step of:
   determining a validity of a change of said current lane in said state machine based on a given lane marker on one side of said vehicle changing from before said change of said current lane to after said change of said current lane.

19. The method according to claim 14, further comprising the step of:
   changing said current lane in said state machine to a null lane outside of said available lanes in response to (i) said previous location of said current lane, (ii) said number of said available lanes and (iii) said lane change information indicating that said vehicle has departed from said road.

20. The method according to claim 14, further comprising the step of:
   initializing said current lane in said state machine as said lane entry in response to said map data indicating that said vehicle has entered said road.

* * * * *